Dec. 25, 1934.  W. J. CALDWELL  1,985,338
EVAPORATIVE COOLING
Filed July 11, 1930

William J. Caldwell
INVENTOR

Patented Dec. 25, 1934

1,985,338

UNITED STATES PATENT OFFICE 1,985,338

EVAPORATIVE COOLING

William J. Caldwell, Independence, Mo., assignor to J. H. McCormick & Co., Williamsport, Pa., a corporation of Pennsylvania Application July 11, 1930, Serial No. 467,238

9 Claims. (Cl. 62—176)

My invention relates to air conditioning systems and has for an object the cooling of air, by first abstracting moisture from the air and then abstracting heat from the air by the evaporation of the moisture. A further object is the dehumidifying of air. Another object is the provision of means to dehumidify and cool air without the use of an auxiliary cooling medium.

These and other objects which will be apparent as the description proceeds, I attain by passing air through a water spray chamber which not only washes and cleanses the air but also saturates the air with moisture from the spray through which the air moves preferably at high velocity. The air laden with moisture, both free moisture in the form of droplets of water and aqueous vapor, passes into a drum formed of perforated metal or heavy screen which is covered with moisture absorbing fabric such as burlap or other textile material, and is rotating at high speed. Within the drum, preferably cylindrical in form, are radial blades which impart to the air a rotary motion as it travels through the drum. Because of this rotary motion, the free moisture is thrown against the inner periphery of the cylindrical drum, passes through the mesh or perforations and is absorbed by the burlap covering which is itself rotating with the drum. The rotation of the burlap induces rapid evaporation of the moisture with consequent cooling of the metal drum and the blades or vanes attached thereto over which the air continues to pass. The passage of the air over these cooled metal surfaces causes absorption of heat from the air itself.

Not only is the free moisture thrown out to the periphery through the perforations of the drum to the absorbing material but, also, the humid air itself contributes moisture to the absorbing material. Thus, the absorbing material is kept in a more or less dampened condition.

Turning now to a specific form of preferred embodiment of my invention, shown in the drawing, Fig. 1 is a partial view of a system comprising a spray chamber and a centrifuge, a portion of the absorbent covering being torn away to show the perforated drum beneath;

Similar reference numerals refer to similar parts in all the views.

Figure 3:
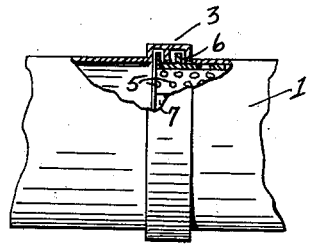
Fig. 3 is a somewhat enlarged detail of Fig. 1 showing the running fit between the centrifuge which rotates and the duct connecting therewith which is stationary.
Figure 2:
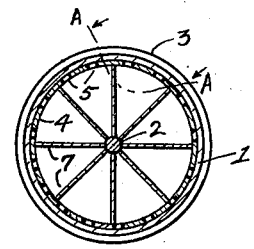
Fig. 2 is an end section of the centrifuge to show the radial blades or vanes within the drum affixing the drum to the shaft.

Fig. 3 has a part section approximately on the line A—A of Fig. 2 and best shows the rotatable perforated metal drum 4 with flanges 6, 6, which fit into recesses of the enlarged end 3 of the duct 9. A similar seal also exists between the drum 4 and the spray chamber 8 at the intake end of the drum.

Figure 1:
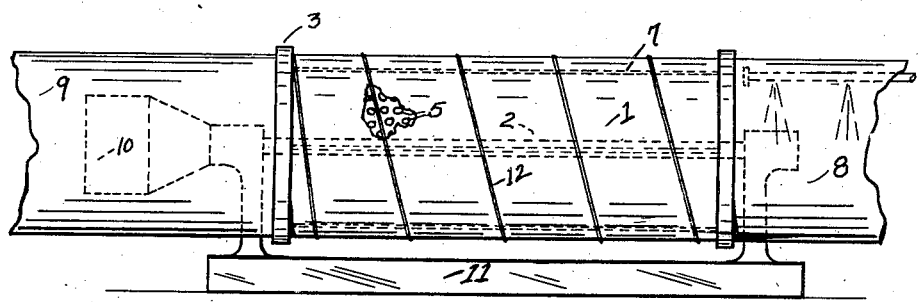

Fig. 1 represents a base member 11 with upright supports carrying bearings for the shaft 2 on which the cylindrical drum 4 is mounted by means of the blades 7, 7, radially located within the drum. Rotation of the shaft and thereby the drum also may be accomplished by any desirable means as, for example, a motor 10 with a stream line housing, within the duct 9 at the outlet side of the centrifuge. The intake of the centrifuge is adjacent a spray chamber 8. The centrifuge itself comprises a drum having the perforations 5, 5, and the absorbent material covering 1, preferably affixed thereto as by wrapping with a binder wire 12. I have found burlap a satisfactory absorbent material for moisture.

In operation, the motor 10 is started and the centrifuge revolves. Air from a blower passes through the spray chamber 8 and enters the drum 4. The blades 7, 7, rotate the air at high speed giving the centrifugal action and moisture which may be carried along from the spray is thrown out to the burlap, absorbed and evaporated by the swirling of the burlap in the air of the room which may, of course, be a special chamber heated, if desired. As the moisture of the burlap is evaporated, heat is abstracted from the metal cylinder and blades and the air within the centrifuge is cooled by contact in passing over the various metal surfaces. The cooling of the air causes further condensation and further abstraction of moisture. Ultimately the discharged air passes from the centrifuge into the connected duct, as 9, somewhat lowered in temperature and with a relative humidity below that which it had on intake from the spray washer. It may be mentioned that one of the difficulties encountered heretofore in air conditioning systems has been to use a spray washer for air and to discharge air therefrom without raising its relative humidity above what it would have been if the air had been dry filtered in place of washed, and yet the great advantages of washing over either dry filters or oil filters in removing fumes and odors and even minute suspended matter when saponified sprays are used as shown and described in my copending application Serial No. 447,252 filed April 25, 1930, are well recognized by those skilled in the art.

At the running joints where the coupling between the centrifuge and the adjacent duct takes place, there will be no intake of outside air because the pressure is greater within than outside. As tight a joint as may be desired can be made by multiplicity of flanges. Heat insulation from adjacent ducts may be accomplished, if desired, in any usual manner known to those in the art.

My invention resides in the combination and arrangement of parts and in the details of construction and in the various steps of the process or method described in this specification and particularly pointed out in the appended claims, it being understood that changes in the particular embodiment of my invention may be made within the scope of what is claimed without departing from the spirit of the invention. I intend no limitations other than those of the claims.

What I claim is:

1. A process of cooling air comprising saturating the air with moisture, driving said air against moisture absorbing material in contact with metal whereby the material is wetted, evaporating moisture from said material thereby cooling said metal, and passing the air over said metal, thereby cooling said air.

2. In a device of the class described, a perforated, heat conductive member, moisture absorbent material in contact with a surface of said member, heat conductive blades in thermal contact with said member adapted and arranged to conduct heat thereto, means to pass moisture laden air against said absorbent material and over said blades and means to evaporate moisture from said moisture absorbing material whereby to cool said member and thereby cool said blades.

3. In an evaporative cooling device, a spray chamber, a heat conductive member, moisture absorbent material in thermal contact with a surface of said member, and means to pass air through said spray chamber, against said moisture absorbent material and over said member, and means to evaporate moisture from said moisture absorbent material, whereby to cool said member and thereby cool said air.

4. In a device of the class described, an evaporative cooler comprising means to substantially saturate air, means to pass said saturated air over moisture absorbent material and dampen said material, means to evaporate moisture from said material, and means whereby the evaporation of moisture from said material cools said air.

5. In a device of the class described, a continuous evaporative cooler comprising a heat conductive member in an air stream, moisture absorbent material in thermal contact with a surface of said member, means to dampen said material from within said member, and means to continuously evaporate moisture from said material while it is being dampened whereby to cool said member and thereby cool said air stream.

6. The process of cooling air comprising saturating the air with moisture, driving said air against moisture absorbing material in contact with metal to wet said material, evaporating moisture from said material by movement of said material in other air thereby cooling said metal, and passing the air to be cooled over said metal thereby cooling said air.

7. In a device of the class described the combination of a heat conductive cylinder having a foraminous wall portion, moisture absorbent material in contact with a surface of said wall portion of said cylinder, heat conductive blades in thermal contact with said wall portion adapted and arranged to conduct heat thereto, means to pass moisture laden air against said absorbent material and over said blades, and means to evaporate moisture from said moisture absorbent material by rotation of said cylinder whereby to cool said cylinder and thereby cool said blades.

8. In a device of the class described, a continuous duct for an air stream, said duct having a rotatable heat conductive section and seals at the ends of said section thwarting passage of air at the points of juncture with the remainder of the duct, said section having a foraminous wall portion, absorbent material covering the foraminous wall portion, heat conductive blades in thermal contact with said wall portion and supporting said section upon a rotating shaft, and means to dampen said absorbent material, whereby the rotation of said section evaporates moisture from said material which cools the supporting blades and thereby cools the air passing through said duct.

9. In a device of the class described, a continuous duct for an air stream, said duct having a rotatable heat conductive section and seals at the ends of said section thwarting passage of air at the points of juncture with the remainder of the duct, said section having a foraminous wall portion, absorbent material in thermal contact with and covering the outer surface of the foraminous wall portion, radially disposed heat conductive blades in thermal contact with the inner surface of said wall portion and supporting said section upon a shaft, means to rotate said shaft, and means to dampen said absorbent material, whereby the rotation of said section evaporates moisture from said material which cools the supporting blades and thereby cools the air passing through said duct.

WILLIAM J. CALDWELL.